United States Patent [19]
Agrawal et al.

[11] Patent Number: 6,108,316
[45] Date of Patent: Aug. 22, 2000

[54] ADAPTIVE SCHEDULING PRIORITIES BASED ON BATTERY POWER LEVEL IN WIRELESS ACCESS PROTOCOLS

[75] Inventors: Prathima Agrawal, New Providence, N.J.; Krishna M. Sivalingam, Greensboro, N.C.; Mani Bhushan Srivastava, Los Angeles, Calif.

[73] Assignee: AT & T Corp, New York, N.Y.

[21] Appl. No.: 08/900,799

[22] Filed: Jul. 25, 1997

[51] Int. Cl.[7] .............................. G08C 17/00; H04Q 7/00
[52] U.S. Cl. ........................... 370/311; 370/329; 370/444
[58] Field of Search ..................................... 370/311, 318, 370/322, 329, 330, 335, 348, 431, 461, 462, 444, 465, 468; 455/69, 70, 522, 527

[56] References Cited

U.S. PATENT DOCUMENTS

| | | | |
|---|---|---|---|
| 5,226,071 | 7/1993 | Bolliger et al. ......................... 455/435 |
| 5,574,979 | 11/1996 | West ........................................... 455/63 |
| 5,752,193 | 5/1998 | Scholefield et al. ..................... 455/452 |
| 5,754,537 | 5/1998 | Jamal ....................................... 370/330 |
| 5,854,787 | 12/1998 | Dodge et al. ............................ 370/349 |

*Primary Examiner*—Chau Nguyen
*Assistant Examiner*—Soon-Dong Hyun

[57] ABSTRACT

A method adapts scheduling priorities in a wireless communications system to conserve battery power in mobile terminals operating within the system. A base station, within the system, receives battery power level information and other setup information from mobile terminals operating within the service area of the base station during call setup procedures. Based on the battery power level information and other setup information, the base station adapts scheduling priorities for the mobile terminals to expedite wireless transmissions from those mobile terminals reporting low battery power levels.

18 Claims, 7 Drawing Sheets

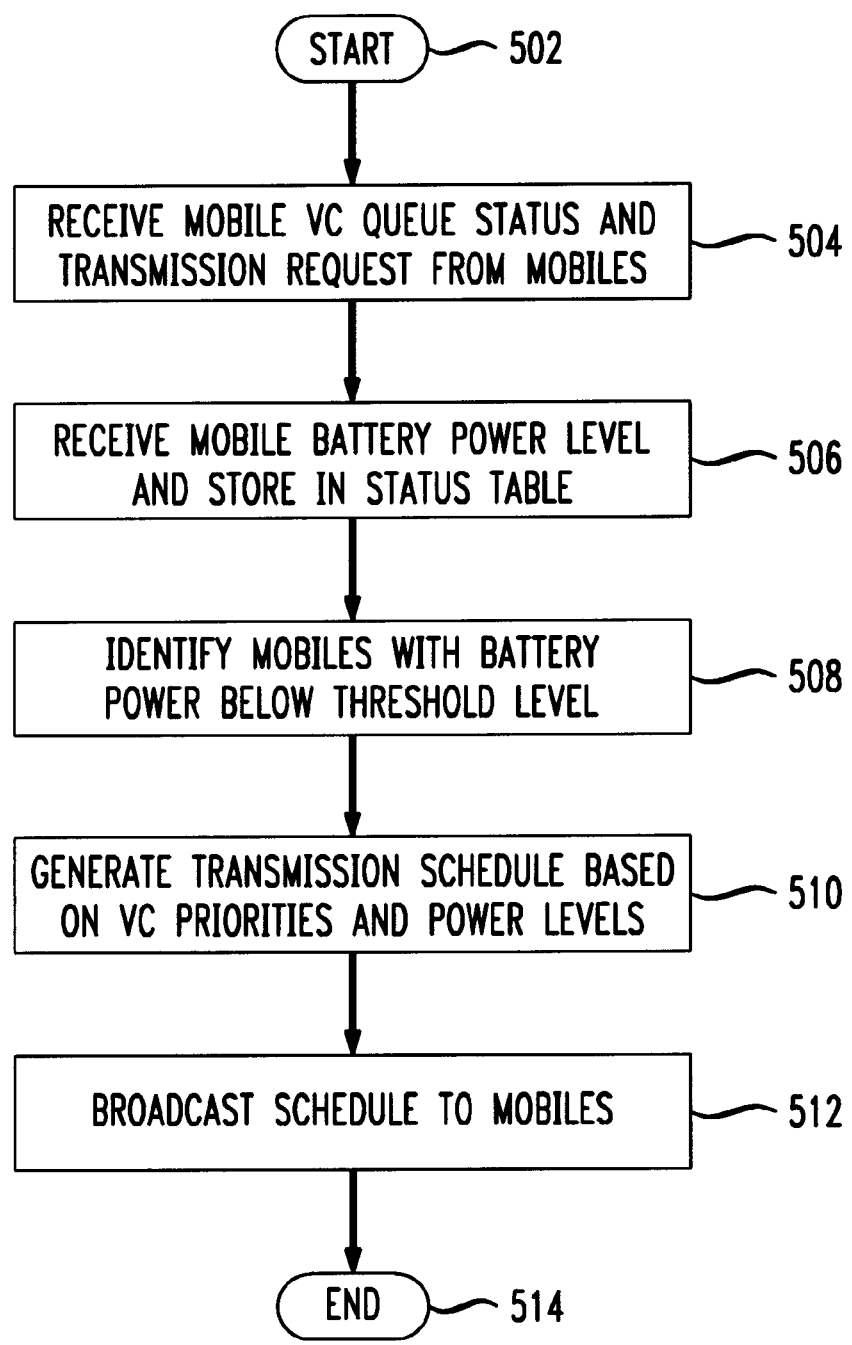

POWER LEVELS: FULL, HALF-FULL, LOW, NEARLY EMPTY
THRESHOLD: LOW

ADAPTIVE SCHEDULING PRIORITIES BASED ON BATTERY POWER LEVEL IN WIRELESS ACCESS PROTOCOLS

TECHNICAL FIELD

This invention relates to telecommunications, and more particularly to a method and apparatus for managing mobile stations in a wireless network.

BACKGROUND

Currently, battery power conservation for mobile terminals operating in a wireless communications system is a significant concern, especially for wireless service providers. This is due primarily to the significant amounts of power expended for wireless transmission by the mobile terminal transmitter. Revenue cannot be generated if mobile terminals cannot complete calls due to their battery power being exhausted. One manual solution is the use of auxiliary power adapters to provide the power source needed for operation of the mobile terminal. However, this solution burdens wireless subscribers with additional costs and requires them to maintain a close proximity of the mobile terminal to the power source, to guarantee wireless service. Passive solutions to the problem involve scheduling the mobile terminal for sleep mode operation. The mobile terminal is instructed by the servicing base station to "wake up" at predetermined intervals to receive RF transmissions from the base station and to transmit RF signals to the base station. Although this solution does provide some relief, it also leads to significant over-the-air delays in the communications link since the base station and mobile terminal must continually buffer messages for longer periods. This delay is magnified further in a wireless communications system that operates on a reservation based protocol. Such a protocol directs mobile terminals to use a limited number of channels at specific times to reduce interference and collisions in the wireless link.

Due to the limitations of the prior art, there is a need for a solution that takes a more active, direct role in managing mobile terminals operating with low battery power levels.

SUMMARY

In accordance with the invention, scheduling priorities in a wireless communications system are adapted to conserve battery power in mobile terminals operating within the system. In a preferred embodiment, a base station, within the system, receives battery power level information and other setup information from mobile terminals operating within the service area of the base station during call setup procedures. Based on the battery power level information and other setup information, the base station adapts scheduling priorities for the mobile terminals to expedite wireless transmissions from those mobile terminals reporting low battery power levels.

The inventive method begins by receiving at the base station a signal from a mobile station that its battery power is below a threshold value. In response to this, the base station changes a mobile transmission schedule to cause transmission of messages from the mobile station to occur before transmission of messages from other stations. The base station then transmits the schedule to the mobile stations. By advancing the scheduled transmission of messages from a mobile station whose battery power is low, those messages have a higher probability of successful transmission before the battery power level diminishes further.

In a further aspect of the invention, the mobile station can have a high priority message and a low priority message to transmit. In accordance with the invention, the base station changes the mobile transmission schedule to cause transmission of the high priority message to occur before transmission of high priority messages from other stations with higher battery power and to cause transmission of the low priority message to occur before transmission of low priority messages from other stations, but not before the transmission of high priority messages from other stations.

In still a further aspect of the invention, a first mobile station can have a first high priority message and a first low priority message to transmit and can have its battery power below a first threshold value. The base station can also receive a signal from a second mobile station that its battery power is below a second threshold value greater than the first threshold value. The second mobile station can have a second high priority message and a second low priority message to transmit. In accordance with the invention, the base station changes the mobile transmission schedule to cause transmission of the messages to be ordered with the first high priority, followed by the second high priority, followed by high priority messages from other stations, followed by the first low priority, followed by the second low priority, followed by low priority messages from other stations.

In yet a further aspect of the invention, the inventive method defines at least a portion of a time division multiple access frame with a first time slot for the messages from the low power mobile station to occur before a second time slot for the messages from the other stations. The mobile station can have a high priority message and a low priority message to transmit. In accordance with the invention, the base station changes the mobile transmission schedule to define at least a portion of a time division multiple access frame with a first time slot for the high priority message to occur before a second time slot for high priority messages from other stations, and with a third time slot for the low priority message to occur before a fourth time slot for low priority messages from other stations, but not before the second time slot for high priority messages from other stations.

In still a further aspect of the invention, the first mobile station can have a first high priority message and a first low priority message to transmit and it can have its battery power below a first threshold value. The base station can receive a signal from a second mobile station that its battery power is below a second threshold value greater than the first threshold value. The second mobile station can have a second high priority message and a second low priority message to transmit. In accordance with the invention, the base station changes the mobile transmission schedule to define at least a portion of a time division multiple access frame with a first time slot for the first high priority message, followed by a second time slot for the second high priority message, followed by a third time slot for the high priority messages from other stations, followed by a fourth time slot for the first low priority message, followed by a fifth time slot for the second low priority message, followed by a sixth time slot for the low priority messages from other stations.

In still a further aspect of the invention, the base station defines an up-link data sub-frame portion of a time division multiple access frame with a first time slot(s) for the messages from the low battery power mobile station to occur before a second time slot for the messages from the other stations. The base station further defines a down-link sub-frame portion of the time division multiple access frame for messages from the base station to the mobile stations. The base station can selectively order the down-link subframe portion to occur either before or after the up-link data sub-frame portion. The base station further defines a down-link broadcast subframe portion of the time division multiple access frame for transmitting the schedule to the mobile stations. The base station further defines an up-link status sub-frame portion of the time division multiple access frame for the signal from the mobile station reporting its battery power status.

In still a further aspect of the invention, the mobile station has a high priority message queue and a low priority message queue. In accordance with the invention, the base station changes the mobile transmission schedule to cause transmission of high priority messages from the high priority message queue to occur before transmission of high priority messages from other stations and to cause transmission of low priority messages from the low priority message queue to occur before transmission of low priority messages from other stations, but not before the transmission of high priority messages from other stations. Further in accordance with the invention, the base station defines an up-link data sub-frame portion of a time division multiple access frame with a first time slot for the messages from the first mobile station to occur before a second time slot for the messages from the other stations, a down-link subframe portion of the time division multiple access frame for messages from the base station to the first and other stations, a down-link broadcast subframe portion of the time division multiple access frame for transmitting the schedule to the first and other stations, and an up-link status sub-frame portion of the time division multiple access frame for the signal from the first mobile station reporting its battery power status and its message queue status. This order can be reversed.

In this manner, the invention takes a more active, direct role in managing mobile terminals operating with low battery power levels.

The discussion in this Summary and the following Brief Description of the Drawings, Detailed Description, and drawings only deal with examples of this invention and are not to be considered in any way a limitation on the scope of the exclusionary rights conferred by a patent which may issue from this application. The scope of such exclusionary rights is set forth in the claims at the end of this application.

BRIEF DESCRIPTION OF THE DRAWINGS

FIG. 5 is a flow diagram of the queue management and scheduling program 430 in the base station B, in accordance with the invention.

DETAILED DESCRIPTION OF THE PREFERRED EMBODIMENTS

The invention disclosed herein solves the problem of efficient battery power consumption for mobile terminals operating in a wireless communications environment. Some of the main sources of power consumption are the transmitter, receiver, the CPU, and the disk. In accordance with the invention, instead of passively or indirectly conserving battery power through the use of sleep or standby modes, the invention actively conserves battery power by rescheduling the operations of the mobile terminal. In response to a low battery power level and other communications criteria reported by an active mobile terminal, the invention enables the mobile terminal to transmit on particular radio channels with higher priority than other mobile terminals having higher battery power levels. In a preferred embodiment, the invention is applied in a wireless communications system using a reservation-based wireless access protocol.

Figure 1:
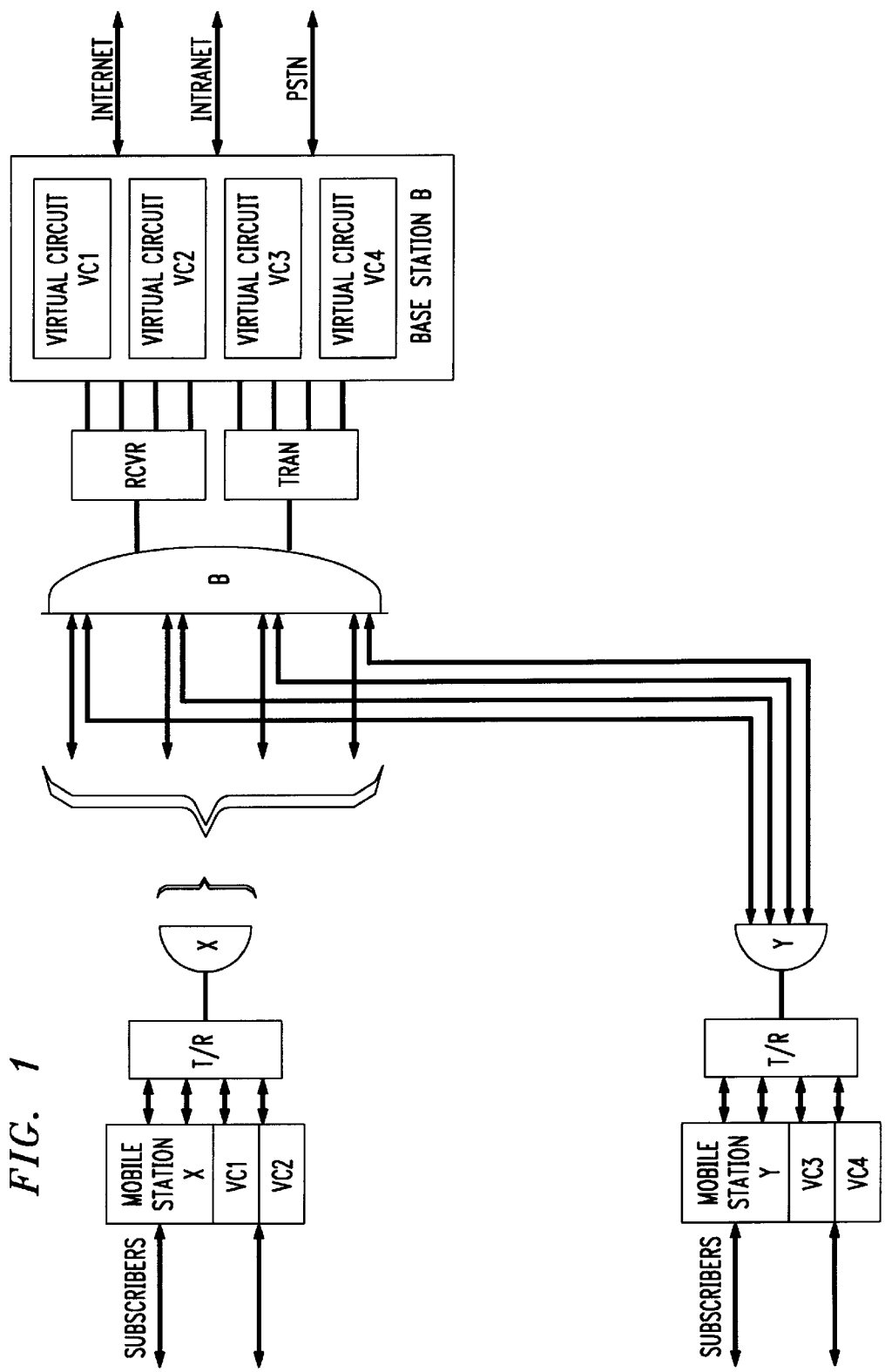
FIG. 1 is a network diagram of a wireless network, in accordance with the invention.

FIG. 1 is a network diagram of a wireless network, in accordance with the invention. Base station B exchanges voice video and data message traffic with the internet, with intranet LANs and WANs, and with the public switched telephone network (PSTN). Base station B is shown communicating that message traffic over a wireless link with mobile station X and mobile station Y. Base station B communicates the voice and data message traffic with mobile station X using virtual circuits VC1 and VC2 and it communicates the voice and data message traffic with mobile station Y using virtual circuits VC3 and VC4. Base station B transmits messages over the wireless link with its transmitter (TRAN) and antenna "B" and receives messages over the wireless link with its receiver (RCVR) and antenna "B". Mobile station X transmits and receives messages for its subscriber over the wireless link using its transmitter/receiver (T/R) and antenna "X". Mobile station Y transmits and receives messages for its subscriber over the wireless link using its transmitter/receiver (T/R) and antenna "Y". In the preferred embodiment of the invention, base station B, mobile station X, and mobile station Y use a time division multiple access protocol to exchange messages over the wireless link.

Figure 2:
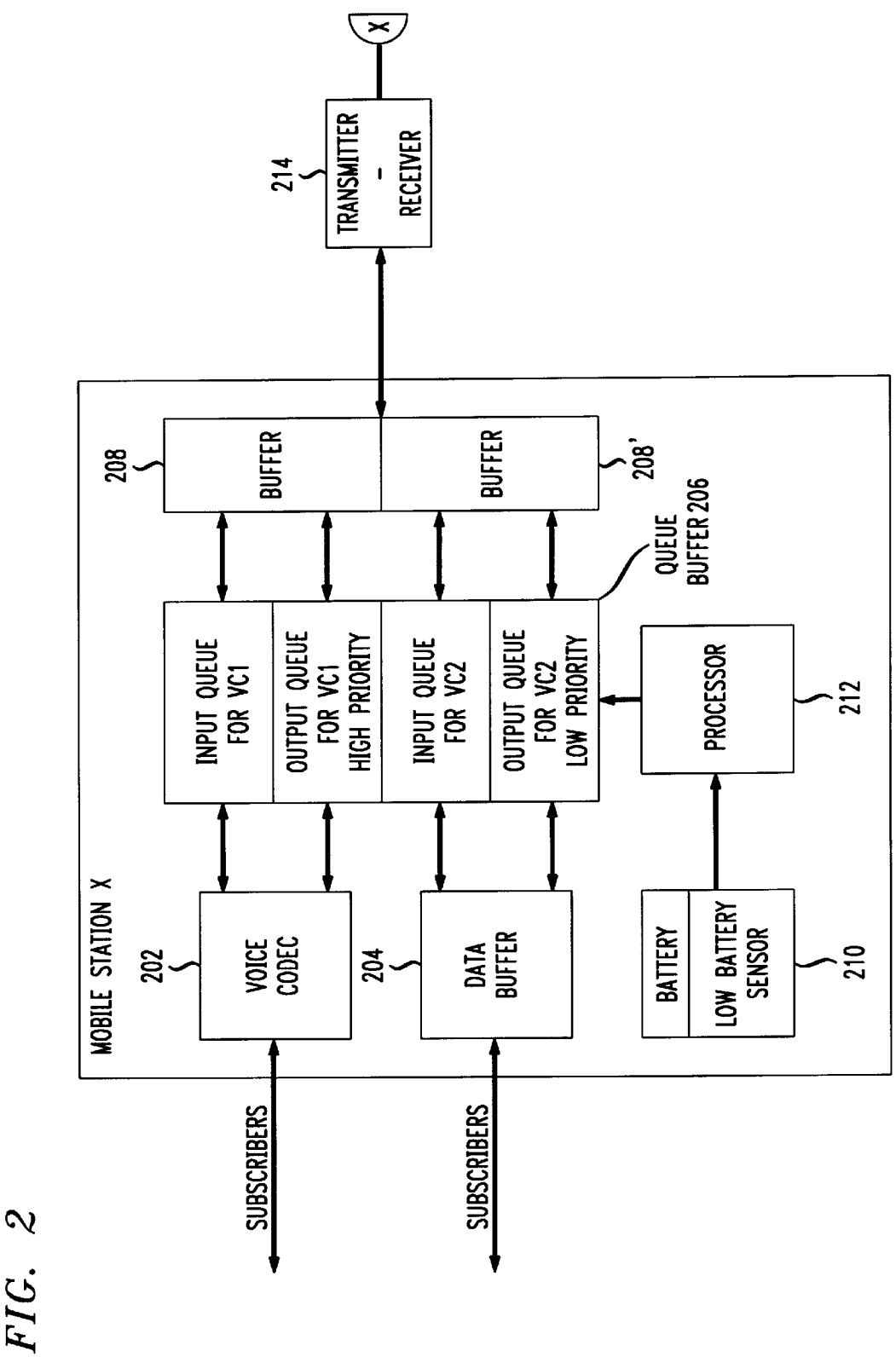
FIG. 2 is an architectural block diagram of the mobile station X, in accordance with the invention.

FIG. 2 is an architectural block diagram of the mobile station X, in accordance with the invention. A subscriber can exchange voice information using the voice CODEC 202 or data information using the data buffer 204. Both the voice CODEC 202 and the data buffer 204 have an interface to the queue buffer 206. The queue buffer 206 contains input and output queues for the virtual circuits VC1 and VC2. The output queue for VC1 is shown in a first example with a high priority and the output queue for VC2 is shown in the first example with a low priority. Outgoing messages in the output queues of buffer 206 are applied to the output buffer 208 for transmission by transmitter/receiver 214 to the base station B. Incoming messages in the input queues of buffer 206 are received from the input buffer 208', received by transmitter/receiver 214 from the base station B. The queue buffer 206 is controlled by the computer processor 212.

The battery that powers the mobile station X is monitored by the low battery sensor 210. The sensor 210 can measure the residual power level of the battery with a range of values. An example of a four increment range is "full power level", half-full power level, low power level, and nearly empty level. The measured residual power level of the battery is output by the sensor 210 to the processor 212. The processor 212 is programmed to prepare a battery status message in either the queue buffer 206 or in the output buffer 208, for transmission to the base station B. The battery status message includes the measured residual power level of the battery output by the sensor 210 to the processor 212. Queue status information can also be included in the battery status message, identifying the priority level of each virtual circuit output queue and other information. The battery status message can be prepared and sent on a periodic basis, or it can be sent only when a low battery condition is detected by the sensor 210.

Figure 3:
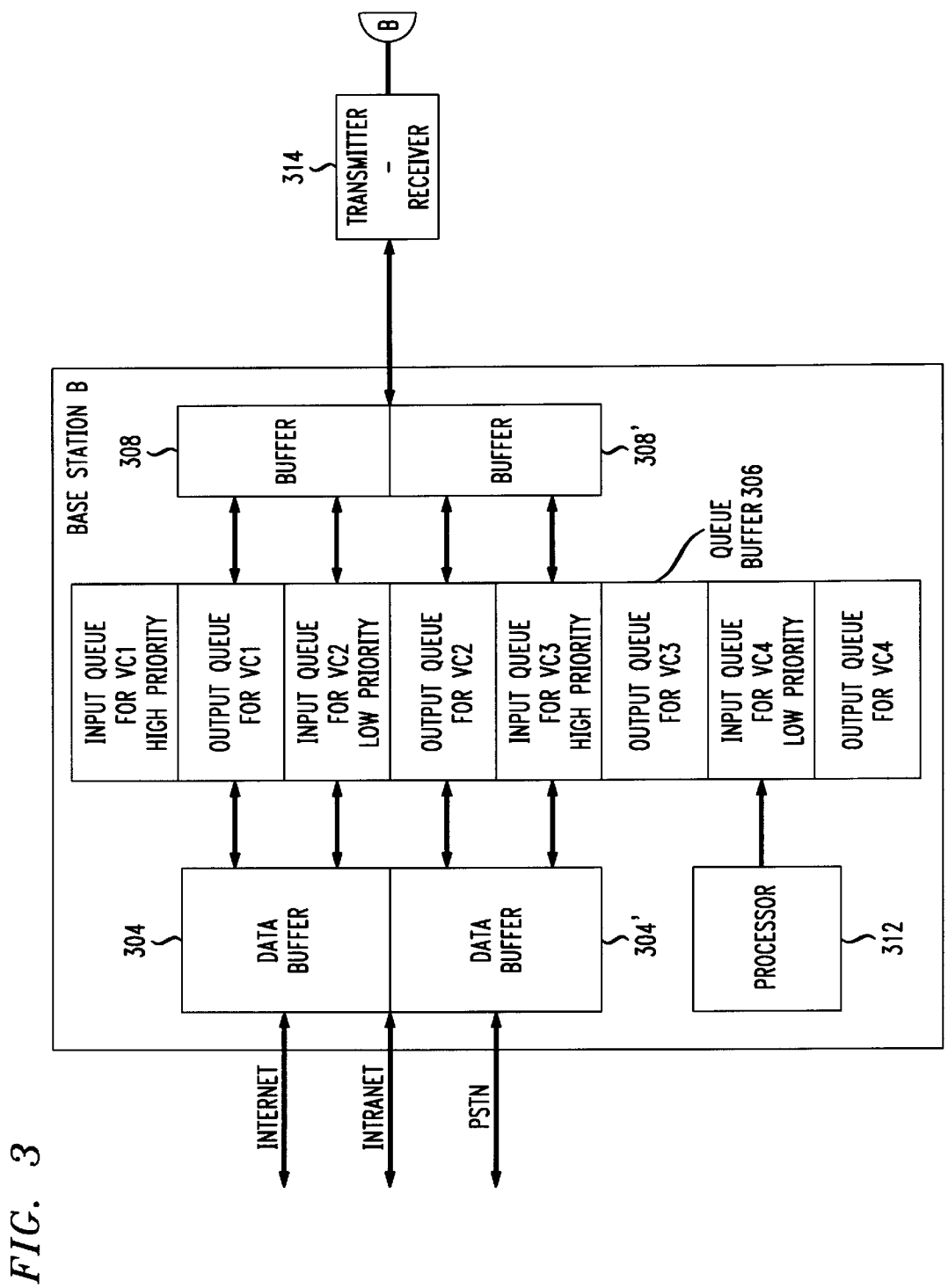
FIG. 3 is an architectural block diagram of the base station B, in accordance with the invention.

FIG. 3 is an architectural block diagram of the base station B, in accordance with the invention. Base station B uses input data buffer 304 and output data buffer 304' to exchange voice and data message traffic with the internet, with intranet LANs and WANs, and with the public switched telephone network (PSTN). Base station B communicates the voice and data message traffic with mobile station X using input and output queues in queue buffer 306 for virtual circuits VC1 and VC2. Base station B communicates the voice and data message traffic with mobile station Y using input and output queues in queue buffer 306 for virtual circuits VC3 and VC4. Outgoing messages in the output queues of buffer 306 are applied to the output buffer 308 for transmission by transmitter/receiver 314 to the mobile stations. Incoming messages in the input queues of buffer 306 are received from the input buffer 308', received by transmitter/receiver 314 from the mobile stations. The queue buffer 306 is controlled by the computer processor 312.

Figure 4:
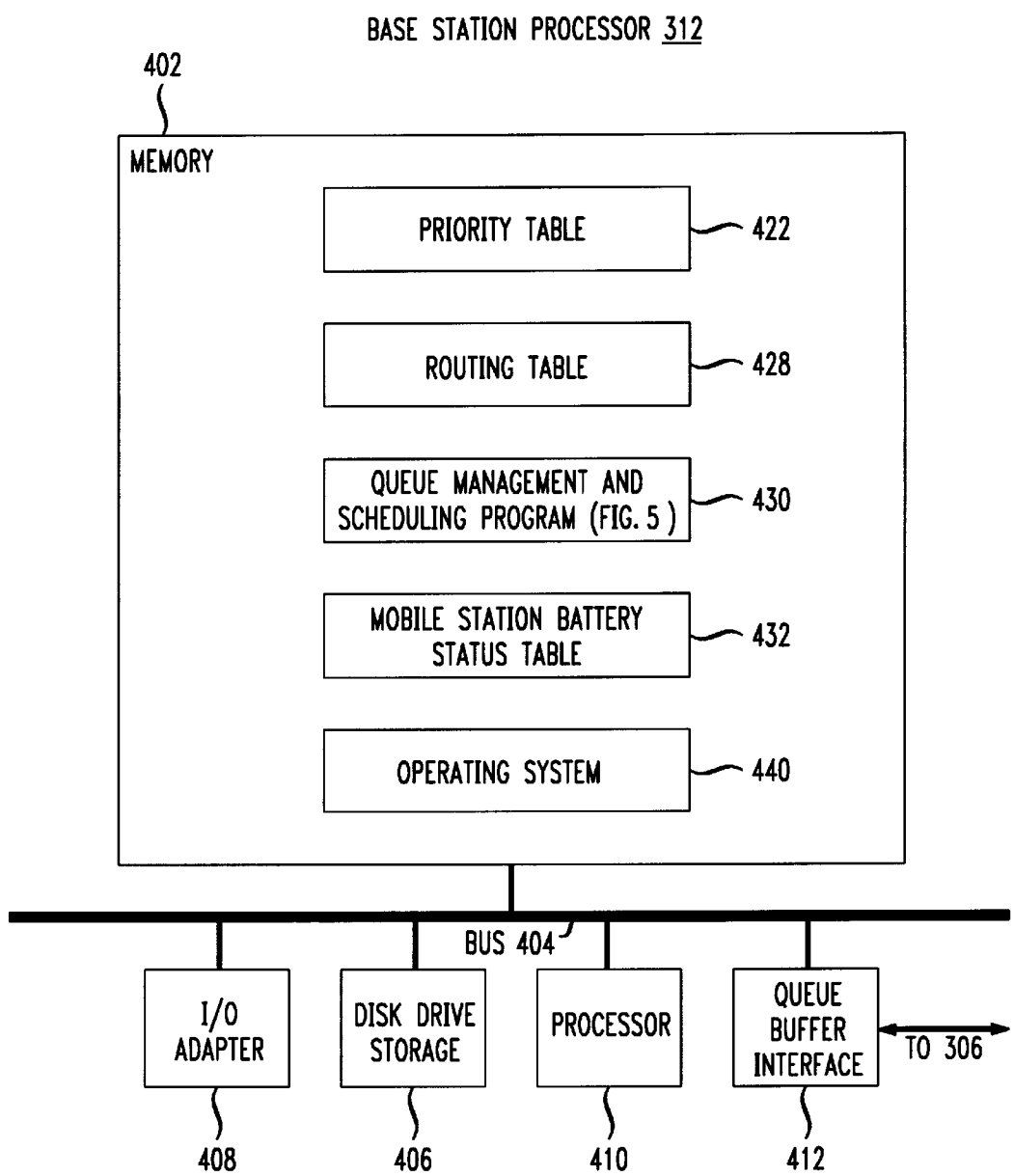
FIG. 4 is a more detailed architectural block diagram of the processor 312 in the base station B, in accordance with the invention.

FIG. 4 is a more detailed architectural block diagram of the processor 312 in the base station B, in accordance with the invention. Processor 312 includes the memory 402 connected by the bus 404 to the I/O adapter 408, the disk drive storage 406, the CPU processor 410 and the queue buffer interface 412. The queue buffer interface 412 is connected to the queue buffer 306. The memory 402 stores a priority table 422 that stores the priority values of the virtual circuit output queues for the mobile stations X and Y that are in active communication with the base station B. This is the queue status information that is included in the battery status message, identifying the priority level of each virtual circuit output queue The memory 402 stores a routing table 428 that routes messages between the mobile stations and the internet, the intranet LANs and WANs, and with the public switched telephone network (PSTN). The memory 402 stores the queue management and scheduling program 430, shown in greater detail in FIG. 5. The memory 402 stores the mobile station battery status table 432 which stores the measured residual power level of the battery reported by the battery status message for each of the mobile stations X and Y that are in active communication with the base station B. And, the memory 402 stores the operating system program 440. The CPU processor 410 processes the program instructions and data that are stored in the memory 402.

FIG. 5 is a flow diagram of the queue management and scheduling program 430 in the base station B, in accordance with the invention. The program starts at step 502 and proceeds to step 504, where the base station receives mobile VC queue status and transmission request messages from the mobile stations. The processor 312 stores virtual channel priority values from these messages into the priority table 422. Then, step 506 has the base station receiving the mobile stations' battery power levels in battery status messages. The battery power levels are stored by processor 312 in the mobile station battery status table 432. Then step 508 has the base station identify mobile stations that have a battery power level below a threshold value P-h. Then step 510 has the base station generate a new transmission schedule for the mobile stations that is based on the virtual channel priorities and the power levels of the mobile stations. Then step 512 has the base station broadcast the new transmission schedule to the mobile stations. Then step 514 ends the program.

Figure 6A:
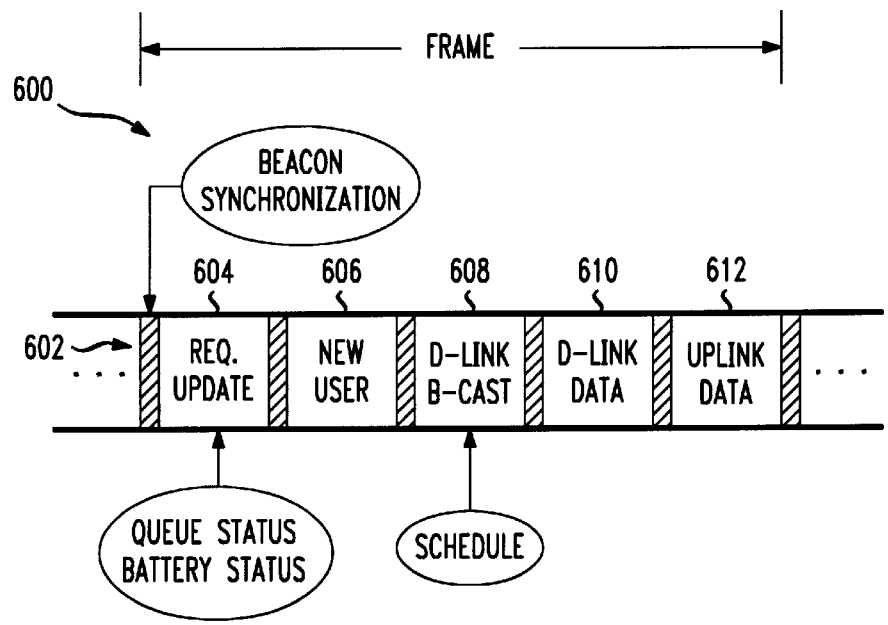
FIGS. 6A and 6B illustrate the time division multiple access frame 600, in accordance with the invention.
Figure 6B:
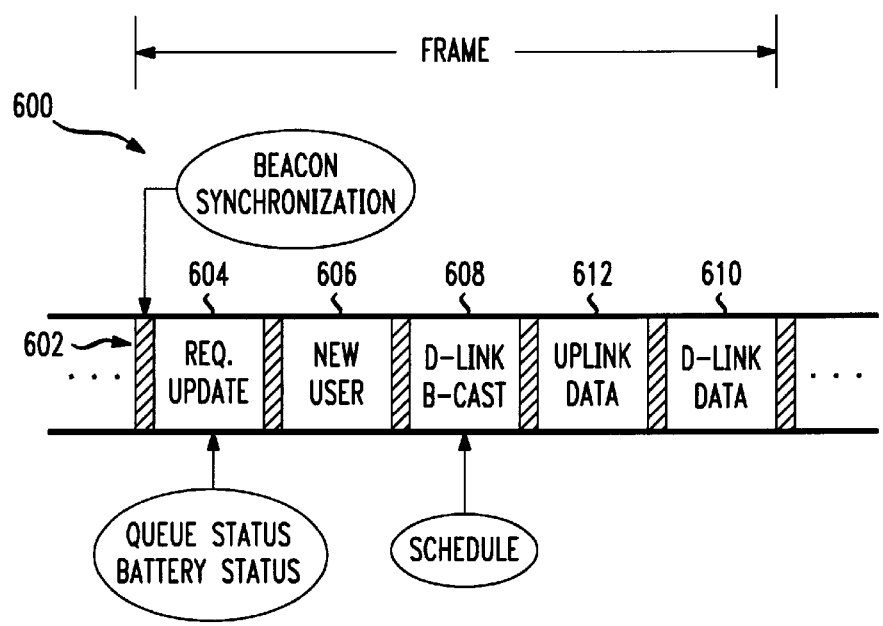

FIGS. 6A and 6B illustrate the time division multiple access frame 600, in accordance with the invention. FIG. 6A shows a first embodiment of the frame 600 which is, for example 30 milliseconds long. The frame 600 begins with a beacon synchronization slot 602 from the base station to the mobile stations. This is followed by a request update slot 604 containing the queue status and the battery status from the mobile stations to the base station, corresponding to steps 504 and 506 of FIG. 5. This is followed by a new user slot 606 from mobile stations that are attempting to start communications sessions with the base station. This is followed by the down-link broadcast slot 608 from the base station to the mobile stations, which sends the new transmission schedule, corresponding to step 512 of FIG. 5. This is followed by the down-link data slot 610 from the base station to the mobile stations, transmitting messages from the output queues of the queue buffer 306 of the base station to the mobile stations. This is followed by the up-link data slot 612 from the mobile stations to the base station, transmitting messages from the output queues of the queue buffer 206 of the mobile stations to the base station. The order of the messages in the up-link data slot 612 from the mobile stations to the base station is governed by the transmission schedule generated in step 510 of FIG. 5. FIG. 6B illustrates an alternate embodiment of the time division multiple access frame 600, where the up-link data slot 612 occurs before the down-link data slot 610, to enable low power mobile stations to send before they receive, thereby increasing the probability that they will have enough residual battery power to complete their transmission. The selection of either format of FIG. 6A or FIG. 6B is done under program control by the processor 312 at the base station.

Figure 7A:
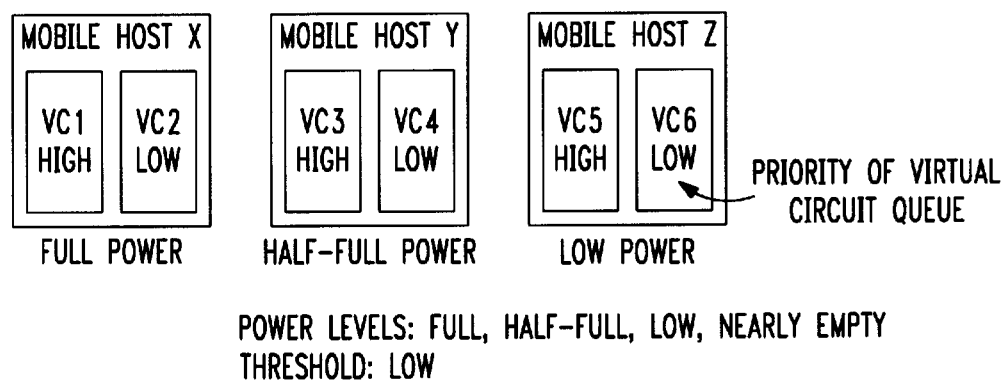
FIGS. 7A, 7B, and 7C illustrate a first example of the operation of the invention.
Figure 7B:
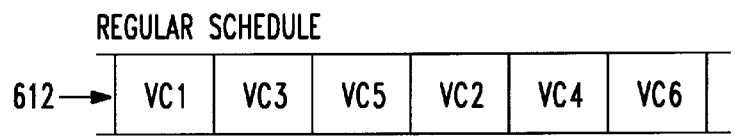
Figure 7C:
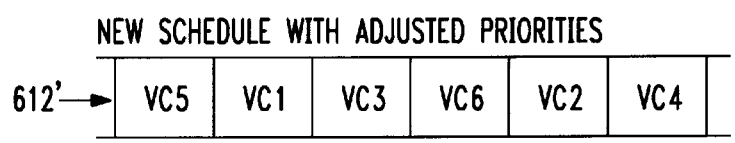

FIGS. 7A, 7B, and 7C illustrate a first example of the operation of the invention. FIG. 7A schematically shows three mobile stations X, Y, and Z. Each mobile station is shown with a queue buffer having two output queues. Mobile station X has its battery at full power level, has the VC1 output queue with a high priority and has the VC2 output queue with a low priority. Mobile station Y has its battery at half-full power level, has the VC3 output queue with a high priority and has the VC4 output queue with a low priority. Mobile station Z has its battery at low power level, has the VC5 output queue with a high priority and has the VC6 output queue with a low priority. FIG. 7B shows the up-link data slot 612 from the mobile stations to the base station before the change in the transmission schedule by step 510 of FIG. 5. The order of the messages in FIG. 7B from the beginning is VC1, VC3, VC5, VC2, VC4, VC6. FIG. 7C shows the up-link data slot 612' from the mobile stations to the base station after the change in the transmission schedule by step 510 of FIG. 5. The order of the messages in FIG. 7C from the beginning is VC5, VC1, VC3, VC6, VC2, VC4.

In a second example of the operation of the invention, each of the three mobile stations X, Y, and Z, once again, has a queue buffer having two output queues. Mobile station X has its battery at low power level, has the VC1 output queue with a high priority and has the VC2 output queue with a high priority. Mobile station Y has its battery at nearly empty power level, has the VC3 output queue with a high priority and has the VC4 output queue with a low priority. Mobile station Z has its battery at full power level, has the VC5 output queue with a high priority and has the VC6 output queue with a low priority. The up-link data slot 612 from the mobile stations to the base station before the change in the transmission schedule by step 510 of FIG. 5 has the order of the messages from the beginning as VC1, VC3, VC5, VC2, VC4, VC6. The up-link data slot 612' from the mobile stations to the base station after the change in the transmission schedule by step 510 of FIG. 5 has the order of the messages from the beginning as VC3, VC1, VC2, VC5, VC4, VC6.

In a third example of the operation of the invention, each of the three mobile stations X Y, and Z, once again, has a queue buffer having two output queues. Mobile station X has its battery at low power level, has the VC1 output queue with a low priority and has the VC2 output queue with a low priority. Mobile station Y has its battery at nearly empty power level, has the VC3 output queue with a low priority and has the VC4 output queue with a low priority. Mobile station Z has its battery at full power level, has the VC5 output queue with a high priority and has the VC6 output queue with a low priority. The up-link data slot 612 from the mobile stations to the base station before the change in the transmission schedule by step 510 of FIG. 5 has the order of the messages from the beginning as VC5, VC1, VC2, VC3, VC4, VC6. The up-link data slot 612' from the mobile stations to the base station after the change in the transmission schedule by step 510 of FIG. 5 has the order of the messages from the beginning as VC5, VC3, VC4, VC1, VC2, VC6.

In accordance with the invention, scheduling priorities in a wireless communications system are adapted to conserve battery power in mobile terminals operating within the system. In a preferred embodiment, a base station, within the system, receives battery power level information and other setup information from mobile terminals operating within the service area of the base station during call setup procedures. Based on the battery power level information and other setup information, the base station adapts scheduling priorities for the mobile terminals to expedite wireless transmissions from those mobile terminals reporting low battery power levels.

The inventive method begins by receiving at the base station a signal from a mobile station that its battery power is below a threshold value. In response to this, the base station changes a mobile transmission schedule to cause transmission of messages from the mobile station to occur before transmission of messages from other stations. The base station then transmits the schedule to the mobile stations. By advancing the scheduled transmission of messages from a mobile station whose battery power is low, those messages have a higher probability of successful transmission before the battery power level diminishes further.

In a further aspect of the invention, the mobile station can have a high priority message and a low priority message to transmit. In accordance with the invention, the base station changes the mobile transmission schedule to cause transmission of the high priority message to occur before transmission of high priority messages from other stations with higher battery power and to cause transmission of the low priority message to occur before transmission of low priority messages from other stations, but not before the transmission of high priority messages from other stations.

In still a further aspect of the invention, a first mobile station can have a first high priority message and a first low priority message to transmit and can have its battery power below a first threshold value. The base station can also receive a signal from a second mobile station that its battery power is below a second threshold value greater than the first threshold value. The second mobile station can have a second high priority message and a second low priority message to transmit. In accordance with the invention, the base station changes the mobile transmission schedule to cause transmission of the messages to be ordered with the first high priority, followed by the second high priority, followed by high priority messages from other stations, followed by the first low priority, followed by the second low priority, followed by low priority messages from other stations.

In yet a further aspect of the invention, the inventive method defines at least a portion of a time division multiple access frame with a first time slot for the messages from the low power mobile station to occur before a second time slot for the messages from the other stations. The mobile station can have a high priority message and a low priority message to transmit. In accordance with the invention, the base station changes the mobile transmission schedule to define at least a portion of a time division multiple access frame with a first time slot for the high priority message to occur before a second time slot for high priority messages from other stations, and with a third time slot for the low priority message to occur before a fourth time slot for low priority messages from other stations, but not before the second time slot for high priority messages from other stations.

In still a further aspect of the invention, the first mobile station can have a first high priority message and a first low priority message to transmit and it can have its battery power below a first threshold value. The base station can receive a signal from a second mobile station that its battery power is below a second threshold value greater than the first threshold value. The second mobile station can have a second high priority message and a second low priority message to transmit. In accordance with the invention, the base station changes the mobile transmission schedule to define at least a portion of a time division multiple access frame with a first time slot for the first high priority message, followed by a second time slot for the second high priority message, followed by a third time slot for the high priority messages from other stations, followed by a fourth time slot for the first low priority message, followed by a fifth time slot for the second low priority message, followed by a sixth time slot for the low priority messages from other stations.

In still a further aspect of the invention, the base station defines an up-link data sub-frame portion of a time division multiple access frame with a first time slot for the messages from the low battery power mobile station to occur before a second time slot for the messages from the other stations. The base station further defines a down-link subframe portion of the time division multiple access frame for messages from the base station to the mobile stations. The base station can selectively order the down-link subframe portion to occur either before or after the up-link data sub-frame portion. The base station further defines a down-link broadcast subframe portion of the time division multiple access frame for transmitting the schedule to the mobile stations. The base station further defines an up-link status sub-frame portion of the time division multiple access frame for the signal from the mobile station reporting its battery power status.

In still a further aspect of the invention, the mobile station has a high priority message queue and a low priority message queue. In accordance with the invention, the base station changes the mobile transmission schedule to cause transmission of high priority messages from the high priority message queue to occur before transmission of high priority messages from other stations and to cause transmission of low priority messages from the low priority message queue to occur before transmission of low priority messages from other stations, but not before the transmission of high priority messages from other stations. Further in accordance with the invention, the base station defines an up-link data sub-frame portion of a time division multiple access frame with a first time slot for the messages from the first mobile station to occur before a second time slot for the messages from the other stations, a down-link subframe portion of the time division multiple access frame for messages from the base station to the first and other stations, a down-link broadcast subframe portion of the time division multiple access frame for transmitting the schedule to the first and other stations, and an up-link status sub-frame portion of the time division multiple access frame for the signal from the first mobile station reporting its battery power status and its message queue status.

In this manner, the invention takes a more active, direct role in managing mobile terminals operating with low battery power levels.

The network coverage area is divided into cells, and each cell is served by a base station B. The mobile station communicates with the rest of the network through the base station. In the case of a radio frequency network, there will be one or more radio frequencies or channels in a cell, available for communication. The base station will dynamically allocate permission to the mobile stations to transmit on the channels. Each mobile station maintains its set of queues to hold data to be transmitted. When a mobile is given permission to transmit on a channel, it selects information from the appropriate queue, and transmits data from that queue.

Information is organized into fixed-size packets or slots. The mobile maintains one queue for each Virtual Circuit connection, and each queue is associated with a priority. Every mobile station in the cell coverage area of the base station informs the base station of the current status of all its virtual circuit queues. The base station schedules packets for transmission from the various queues based on the status of the queues and the queue priorities. The invention adaptively varies the priorities of the connections based on the battery power level of the mobile station.

The mobile station radio operates in three modes: transmit, active receive and sleep. Typically, maximum power is consumed during transmit mode, and least power is consumed during sleep or standby mode. It is essential to optimize the time spent during transmit and receive modes to achieve packet transmission and reception.

In addition to status about the queue, the mobile station also transmits its battery power level. In the examples given herein, four discrete power levels are transmitted to the base station: full, half-full, low, nearly-empty. The base station makes the slot allocations using the queue status and priority information, and the battery power information. This ensures that mobiles with lower battery power are allowed to transmit ahead of other mobiles, data from VCs of equal priority.

The scheduling algorithm for up-link traffic overlays the priorities created due to battery-level over the packet priorities as captured in the queue status information. Thus the transmission queues are ordered by a new priority which is derived by the two component priorities. Thus, mobile station X with lower battery power level will be permitted to transmit packets with a higher priority than another mobile station Y with a safe battery level transmitting packets with identical cell priority as X. For datagram packets with no notion of priorities, the base station will determine the schedules based entirely on the battery power levels of the transmitting mobile stations.

The invention provides an efficient, transparent, and low-cost methodology for enhancing the performance of mobile terminals. Instead of using sleep mode algorithms which cause significant delay due to the required longerbuffering at the base station, the invention provides an optimum methodology which actively responds to real-time mobile terminal batter power levels to ensure an acceptable quality-of-service. Therefore, the invention, by using a more direct approach, enables the low-power mobile terminal to continue transmitting high priority messages to the wireless base station.

Although the invention has been described using four specific battery power levels, it is not deemed a departure from the scope of the appended claims for other named or other numbered battery power levels to be used.

Various illustrative examples of the invention have been described in detail. In addition, however, many modifications and changes can be made to these examples without departing from the nature and spirit of the invention.

What is claimed is:

1. A method to manage mobile stations in a wireless network, comprising:

receiving at a base station a signal from a first mobile station that its battery power is below a first threshold value, said first mobile station having a first high priority message and a first low priority message to transmit and having its battery power below a first threshold value;

receiving at a base station a signal from a second mobile station that its battery power is below a second threshold value greater than the first threshold value said second mobile station having a second high priority message and a second low priority message to transmit;

changing at the base station a mobile transmission schedule to cause transmission of messages from the first mobile station to occur before transmission of messages from other stations, in response to the signal, said changing step causing transmission of said messages to be ordered with the first high priority message, followed by the second high priority message, followed by high priority messages from other stations, followed by the first low priority message, followed by the second low priority message, followed by low priority messages from other stations;

transmitting the schedule to the first and other stations.

2. The method of claim 1, which further comprises:

said changing step defining at least a portion of a time division multiple access frame with a first time slot for said first high priority message to occur before a second time slot for the second high priority message, and with a third time slot for said first low priority message to occur before a fourth time slot for the second low priority message, but not before the second time slot for second time slot for the second high priority message.

3. The method of claim 1, which further comprises:

said changing step defining an up-link data sub-frame portion of a time division multiple access frame with a first time slot for the messages from the first mobile station to occur before a second time slot for messages from the second mobile station;

defining a down-link subframe portion of the time division multiple access frame for messages from the base station to the first and second mobile stations; ordering said down-link subframe portion to occur before said up-link data sub-frame portion.

4. The method of claim 1, which further comprises:

said changing step defining an up-link data sub-frame portion of a time division multiple access frame with a first time slot for the messages from the first mobile station to occur before a second time slot for the messages from the second mobile station;

defining a down-link subframe portion of the time division multiple access frame for messages from the base station to the first and second mobile station;

ordering said down-link subframe portion to occur after said up-link data sub-frame portion.

5. The method of claim 1, which farther comprises:

said changing step defining an up-link data sub-frame portion of a time division multiple access frame with a first time slot for the messages from the first mobile station to occur before a second time slot for the messages from the second mobile station;

defining a down-link subframe portion of the time division multiple access frame for messages from the base station to the first and second mobile stations; and defining a down-link broadcast subframe portion of the time division multiple access frame for transmitting the schedule to the first and second station.

6. The method of claim 1, which further comprises:

said changing step defining an up-link data sub-frame portion of a time division multiple access frame with a first time slot for the messages from the first mobile station to occur before a second time slot for the messages from the second station;

defining a down-link subframe portion of the time division multiple access frame for messages from the base station to the first and second mobile stations;

defining a down-link broadcast subframe portion of the time division multiple access frame for transmitting the schedule to the first and second mobile stations; and defining an up-link status sub-frame portion of the time division multiple access frame for the signal from the first mobile station reporting its battery power status.

7. The method of claim 1, which further comprises:

said first mobile station having a high priority message queue and a low priority message queue;

said changing step causing transmission of high priority messages from said high priority message queue to occur before transmission of high priority messages from the second and other mobile stations;

said changing step causing transmission of low priority messages from said low priority message queue to occur before transmission of low priority messages from other stations, but not before the transmission of high priority messages from the second and other mobile stations.

8. The method of claim 1, which further comprises:

said first mobile station having a high priority message queue and a low priority message queue;

said changing step causing transmission of high priority messages from said high priority message queue to occur before transmission of high priority messages from the second and other mobile stations;

said changing step causing transmission of low priority messages from said low priority message queue to occur before transmission of low priority messages from the second and other mobile stations, but not before the transmission of high priority messages from the second and other mobile stations;

said changing step defining an up-link data sub-frame portion of a time division multiple access frame with a first time slot for the messages from the first mobile station to occur before a second time slot for the messages from the second mobile station or other time slots for the messages from the other mobile stations;

defining a down-link subframe portion of the time division multiple access frame for messages from the base station to the first, second, and other mobile stations;

defining a down-link broadcast subframe portion of the time division multiple access frame for transmitting the schedule to the first, second, and other mobile stations; and defining an up-link status sub-frame portion of the time division multiple access frame for the signal from the first mobile station reporting its battery power status and its message queue status.

9. A method to manage mobile stations in a wireless network, comprising:

receiving at a base station a signal from a first mobile station that its battery power is below a threshold value, said first mobile station having a first high priority message and a first low priority message to transmit and having its battery power below a first threshold value;

receiving at a base station a signal from a second mobile station that its battery power is below a second threshold value greater than the first threshold value, said second mobile station having a second high priority message and a second low priority message to transmit;

changing at the base station a mobile transmission schedule to cause transmission of messages from the first mobile station to occur before transmission of messages from other stations, in response to the signal, said changing step defining at least a portion of a time division multiple access frame with a first time slot for the first high priority message, followed by a second time slot for the second high priority message, followed by a third time slot for the high priority messages from other mobile stations, followed by a fourth time slot for the first low priority message, followed by a fifth time slot for the second low priority message, followed by a sixth time slot for the low priority messages from other mobile stations; and transmitting the schedule to the first and other mobile stations.

10. A system to manage mobile stations in a wireless network, comprising: means for receiving at a base station a signal from a first mobile station that its battery power is below a first threshold value, said first mobile station having a first high priority message and a first low priority message to transmit and having its battery power below a first threshold value;

means for receiving at a base station a signal from a second mobile station that its battery power is below a second threshold value greater than the first threshold value said second mobile station having a second high priority message and a second low priority message to transmit; means for changing at the base station a mobile transmission schedule to cause transmission of messages from the first mobile station to occur before transmission of messages from other stations, in response to the signal, said changing step causing transmission of said messages to be ordered with the first high priority message, followed by the second high priority message, followed by high priority messages from other stations, followed by the first low priority message, followed by the second low priority message, followed by low priority messages from other stations;

means for transmitting the schedule to the first and other stations.

11. The system of claim 10, which further comprises:

said changing means defining at least a portion of a time division multiple access frame with a first time slot for said first high priority message to occur before a second time slot for the second high priority message, and with a third time slot for said first low priority message to occur before a fourth time slot for the second low priority message, but not before the second time slot for second time slot for the second high priority message.

12. The system of claim 10, which further comprises:

said changing means defining an up-link data sub-frame portion of a time division multiple access frame with a first time slot for the messages from the first mobile station to occur before a second time slot for messages from the second mobile station;

means for defining a down-link subframe portion of the time division multiple access frame for messages from the base station to the first and second mobile stations;

means for ordering said down-link subframe portion to occur before said up-link data sub-frame portion.

13. The system of claim 10, which further comprises:

said changing means defining an up-link data sub-frame portion of a time division multiple access frame with a first time slot for the messages from the first mobile station to occur before a second time slot for the messages from the second mobile station;

means for defining a down-link subframe portion of the time division multiple access frame for messages from the base station to the first and second mobile station;

ordering said down-link subframe portion to occur after said up-link data sub-frame portion.

14. The system of claim 10, which further comprises:

said changing means defining an up-link data sub-frame portion of a time division multiple access frame with a first time slot for the messages from the first mobile station to occur before a second time slot for the messages from the second mobile station;

means for defining a down-link subframe portion of the time division multiple access frame for messages from the base station to the first and second mobile stations; and means for defining a down-link broadcast subframe portion of the time division multiple access frame for transmitting the schedule to the first and second station.

15. The system of claim 10, which further comprises:

said changing means defining an up-link data sub-frame portion of a time division multiple access frame with a first time slot for the messages from the first mobile station to occur before a second time slot for the messages from the second station;

means for defining a down-link subframe portion of the time division multiple access frame for messages from the base station to the first and second mobile stations;

means for defining a down-link broadcast subframe portion of the time division multiple access frame for transmitting the schedule to the first and second mobile stations; and means for defining an up-link status sub-frame portion of the time division multiple access frame for the signal from the first mobile station reporting its battery power status.

16. The system of claim 10, which further comprises:

said first mobile station having a high priority message queue and a low priority message queue;

said changing means causing transmission of high priority messages from said high priority message queue to occur before transmission of high priority messages from the second and other mobile stations;

said changing means causing transmission of low priority messages from said low priority message queue to occur before transmission of low priority messages from other stations, but not before the transmission of high priority messages from the second and other mobile stations.

17. The system of claim 10, which further comprises:

said first mobile station having a high priority message queue and a low priority message queue;

said changing means causing transmission of high priority messages from said high priority message queue to occur before transmission of high priority messages from the second and other mobile stations;

said changing means causing transmission of low priority messages from said low priority message queue to occur before transmission of low priority messages from the second and other mobile stations, but not before the transmission of high priority messages from the second and other mobile stations;

said changing means defining an up-link data sub-frame portion of a time division multiple access frame with a first time slot for the messages from the first mobile station to occur before a second time slot for the messages from the second mobile station or other time slots for the messages from the other mobile stations;

means for defining a down-link subframe portion of the time division multiple access frame for messages from the base station to the first, second, and other mobile stations;

means for defining a down-link broadcast subframe portion of the time division multiple access frame for transmitting the schedule to the first, second, and other mobile stations; and means for defining an up-link status sub-frame portion of the time division multiple access frame for the signal from the first mobile station reporting its battery power status and its message queue status.

18. A system to manage mobile stations in a wireless network, comprising:

means for receiving at a base station a signal from a first mobile station that its battery power is below a threshold value, said first mobile station having a first high priority message and a first low priority message to transmit and having its battery power below a first threshold value;

means for receiving at a base station a signal from a second mobile station that its battery power is below a second threshold value greater than the first threshold value, said second mobile station having a second high priority message and a second low priority message to transmit;

means for changing at the base station a mobile transmission schedule to cause transmission of messages from the first mobile station to occur before transmission of messages from other stations, in response to the signal, said changing step defining at least a portion of a time division multiple access frame with a first time slot for the first high priority message, followed by a second time slot for the second high priority message, followed by a third time slot for the high priority messages from other mobile stations, followed by a fourth time slot for the first low priority message, followed by a fifth time slot for the second low priority message, followed by a sixth time slot for the low priority messages from other mobile stations; and means for transmitting the schedule to the first and other mobile stations.

* * * * *